(12) United States Patent
Kang et al.

(10) Patent No.: US 12,281,543 B1
(45) Date of Patent: Apr. 22, 2025

(54) INTEGRATED DEVICE AND METHOD FOR CONTINUOUSLY CAPTURING, STORING AND SEPARATING FLUE GAS IN UNDERGROUND ROCK STRATUM

(71) Applicant: Taiyuan University of Technology, Taiyuan (CN)

(72) Inventors: Zhiqin Kang, Taiyuan (CN); Zhihui Wu, Taiyuan (CN); Xiaoyu Wang, Taiyuan (CN); Xiaoyu Zhang, Taiyuan (CN); Lei Wang, Taiyuan (CN); Jing Zhao, Taiyuan (CN); Dong Yang, Taiyuan (CN); Weiguo Liang, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 0 days.

(21) Appl. No.: 18/798,438

(22) Filed: Aug. 8, 2024

(51) Int. Cl.
*E21B 41/00* (2006.01)
*B01D 53/54* (2006.01)
(Continued)

(52) U.S. Cl.
CPC .......... *E21B 41/0064* (2013.01); *B01D 53/54* (2013.01); *B01D 53/62* (2013.01);
(Continued)

(58) Field of Classification Search
None
See application file for complete search history.

(56) References Cited

U.S. PATENT DOCUMENTS

| | | | |
|---|---|---|---|
| 7,988,750 B2 * | 8/2011 | Lee | C10L 3/10 48/127.3 |
| 2009/0062593 A1 * | 3/2009 | Bruno | B01D 53/1475 588/250 |

(Continued)

FOREIGN PATENT DOCUMENTS

| | | |
|---|---|---|
| CN | 114575800 A | 6/2022 |
| CN | 114575800 B | 7/2022 |

(Continued)

OTHER PUBLICATIONS

Chinese Office Action issued Apr. 10, 2024 in corresponding Chinese Application No. 202410254747.3.

*Primary Examiner* — Andrew Sue-Ako
(74) *Attorney, Agent, or Firm* — Global IP Counselors, LLP

(57) ABSTRACT

An integrated device and a method for continuously capturing, storing and separating a flue gas in an underground rock stratum are provided. An injection well, a monitoring well and an emission well are arranged in sequence at locations from near to far from a flue gas emission source. The injection well, the monitoring well and the emission well are respectively drilled to different depths in a storage rock stratum. A horizontal injection channel is arranged at bottom end of the injection well. During migrating the flue gas in the storage rock stratum, $CO_2$ and sulfur nitride are absorbed by a rock porous medium and gradually enriched, and meanwhile, the $CO_2$ and sulfur nitride, after chemically reacting with water, minerals and biomass in a rock, are gradually mineralized to achieve storage; and separated $N_2$ is gradually migrated upwards to the emission well to achieve separation.

9 Claims, 2 Drawing Sheets

(51) Int. Cl.
*B01D 53/62* (2006.01)
*E21B 34/02* (2006.01)
*E21B 47/00* (2012.01)

(52) U.S. Cl.
CPC .............. *E21B 34/02* (2013.01); *E21B 47/00* (2013.01); *B01D 2256/10* (2013.01); *B01D 2257/40* (2013.01); *B01D 2257/504* (2013.01); *B01D 2258/0283* (2013.01)

(56) References Cited

U.S. PATENT DOCUMENTS

2015/0226133 A1\* 8/2015 Minto ..................... F02C 9/48
  60/39.27
2020/0291901 A1\* 9/2020 Song .................. F02M 21/0215

FOREIGN PATENT DOCUMENTS

| | | |
|---|---|---|
| CN | 115646127 A | 1/2023 |
| CN | 117321287 A | 12/2023 |

\* cited by examiner

INTEGRATED DEVICE AND METHOD FOR CONTINUOUSLY CAPTURING, STORING AND SEPARATING FLUE GAS IN UNDERGROUND ROCK STRATUM

CROSS-REFERENCE TO RELATED APPLICATION

This patent application claims the benefit and priority of Chinese Patent Application No. 202410254747.3 filed with the China National Intellectual Property Administration on Mar. 6, 2024, the disclosure of which is incorporated by reference herein in its entirety as part of the present application.

BACKGROUND

Technical Field

The present disclosure relates to the technical field of the geological storage of $CO_2$, and in particular to an integrated device and a method for continuously capturing, storing and separating a flue gas in an underground rock stratum.

Background Information

Carbon capture, utilization and storage (CCUS for short) refers to the scheme of separating $CO_2$ from fuel emissions by various technical means for storage and utilization. However, high cost and technical difficulty are still the main obstacles to the development of CCUS, which leads to the unclear business model and makes the CCUS impossible to popularize in a short time. Specifically, there are fatal shortcomings in the capture, transportation and storage links. (1) Capture link: Capture is the highest-cost link of CCUS project, which generally accounts for 60%-80% of the total project cost. The capture cost of $CO_2$ in the flue gas is 300-900 Yuan/ton, and $CO_2$ emission from 1 ton of standard coal is 2.66-2.72 tons, so the capture cost of $CO_2$ generated from 1 ton of standard coal is much higher than its coal price, resulting in poor economy of carbon capture under the current technical conditions. (2) Transportation link. $CO_2$ transportation mainly depends on pipeline transportation, tank car transportation and ship transportation. The infrastructure cost for long-distance pipeline transportation is high, and the spatial difference between the location of carbon emission sources and the storage location makes it difficult to form a pipe network. In tank car and ship transportation, $CO_2$ needs to be compressed and injected into the tank first, which leads to high power consumption cost and complicated links; the compressed volume of 2.66-2.72 tons of $CO_2$ emitted from 1 ton of standard coal is also much larger than the volume of original coal, the mass of the storage tank should be accumulated in the transportation process, and a large amount of fuel such as gasoline and diesel oil need to be consumed in the transportation process, making the transportation cost of the $CO_2$ much higher than that of coal transportation. Moreover, all the links involved are the process of producing a large amount of carbon, which has more harm than good. (3) Storage link. At present, it is considered that the dominant geological storage areas of $CO_2$ are coal seams, saline aquifers and depleted oil and gas reservoirs, which are often far away from carbon emission enterprises and difficult to achieve the matching of the geographical space of emission sources, and thus, the capture and transportation links are required. The general coal seam is low in thickness (3-10 m), making the storage capacity limited; and the coal reservoir has a compact structure and high pressure, and methane needs to be continuously replaced in the storage process, leading low efficiency and difficulty to achieve large-scale injection. The scheme of goaf storage put forward by many people has the rick of leakage due to a fact that the goaf often communicates with the earth surface through the fracture zone. The stored $CO_2$ can only be atmospheric gas, so the storage capacity is extremely limited.

At present, the storage sites of the existing CCUS demonstration projects are basically selected in coal seams, saline aquifers and oil and gas reservoirs, among which, only the $CO_2$ enhanced oil recovery ($CO_2$-EOR) in the oil and gas reservoirs is slightly economical. However, the whole consumption of $CO_2$ flooding is about several million tons per year, which is far from the total $CO_2$ emission of 10.3 billion tons per year, and the carbon emission problem cannot be fundamentally solved. Therefore, it is urgent to find a universal, continuous and low-cost carbon sequestration scheme with less links and large treatment scale.

In Chinese Patent NOS. CN114575800B and CN115646127B, a method for in-situ deep supercritical storage of $CO_2$ at a flue gas emission source is provided. A well is drilled near a flue gas emission port of a power plant, and then the flue gas is injected on the spot to store $CO_2$, without the need for the process of "capture-purification-transportation" of $CO_2$ and the investment of related technical equipment. However, the core principle of a single-well synchronous injection separation mode adopted is that $CO_2$ and sulfur nitride in the flue gas are deposited at the bottom of a wellhole after being liquefied by applied high pressure, and the $N_2$ which is not easy to liquefy is emitted from the wellhead, and the injection pressure is up to 15 MPa. It is found after analyzing the principle in detail that the concentration of $CO_2$ in general flue gas is calculated as 15%, and according to Dalton's law of partial pressure, the injection pressure must reach at least 40 MPa to achieve $CO_2$ liquefaction and separation from $N_2$ in the single wellbore. However, the existing large-scale gas compressors with the best performance cannot reach such high pressure, and it is difficult to achieve the separation of $CO_2$ and sulfur nitride from $N_2$ in the single well.

SUMMARY

In order to overcome the disadvantages of the prior art, an integrated device for continuously capturing, storing and separating a flue gas in an underground rock stratum and a method are provided.

In order to achieve the objective above, the present disclosure is achieved through the following technical solution.

An integrated device for continuously capturing, storing and separating a flue gas in an underground rock stratum is provided. An injection well, a monitoring well and an emission well are arranged in sequence at locations from near to far from a flue gas emission source. A distance from the injection well to the flue gas emission source is less than 1 km, a distance from the monitoring well to the flue gas emission source is 2-5 km, and a distance from the emission well to the flue gas emission source is 5-10 km. The injection well, the monitoring well and the emission well are respectively drilled to different depths in a storage rock stratum. A horizontal injection channel is arranged at a bottom end of the injection well. A backpressure valve is installed at a wellhead location of each of the monitoring well and the emission well.

The flue gas is pressed into the injection well, and enters the storage rock stratum along the horizontal injection channel. The $CO_2$ and sulfur nitride in the flue gas are dynamically captured and stored in the process of migrating in the storage rock stratum, and $N_2$ is gradually separated and then migrated upwards to the emission well to be emitted.

Further, the injection well, the monitoring well and the emission well are arranged in sequence at locations from near to far from a flue gas emission source, so as to form a well pattern. The number of the injection wells is at least one, the number of the monitoring wells is at least two, and the number of the emission wells is at least four. A pore aperture diameter of the emission well is greater than that of the monitoring well and less than that of the injection well.

Further, the injection well, the monitoring well and the emission well are respectively drilled to different depths in the storage rock stratum, indicating that an end hole location of the injection well is located at a lower middle region of the storage rock stratum, an end hole location of the monitoring well is located at a middle region of the storage rock stratum, and an end hole location of the emission well is located at an upper middle region of the storage rock stratum.

Further, a length of the horizontal injection channel is between the injection well and the emission well, and the horizontal injection channel is not in communication with the monitoring well.

Furthermore, the horizontal injection channel is formed by implementing hydraulic fracturing or a directional horizontal well at the bottom end of injection well.

Further, each of a roof and a floor of the storage rock stratum has a lithology of an impermeable caprock.

A method for capturing, storing and separating flue gas implemented by the integrated device for continuously capturing, storing and separating a flue gas in an underground rock stratum includes the following steps:
(1) drilling and completing an injection well, a monitoring well and an emission well;
(2) implementing a perforation operation at a storage rock stratum section at a lower portion in the injection well to form a flue gas injection hole, and making a horizontal injection channel at a bottom end of the injection well;
(3) after dust removal and cooling, pressing the flue gas into the injection well, to enter the storage rock stratum through the flue gas injection hole and the horizontal injection channel, wherein an injection pressure of the flue gas is less than or equal to 10 MPa; and
(4) during migrating the flue gas in the storage rock stratum, adsorbing $CO_2$ and sulfur nitride by a rock porous medium, and gradually enriching the $CO_2$ and sulfur nitride into the rock porous medium to achieve capture of the $CO_2$; meanwhile, gradually mineralizing the $CO_2$ and sulfur nitride after the $CO_2$ and sulfur nitride chemically react with water, minerals and biology bacteria in a rock to achieve storage of the $CO_2$, and gradually migrating separated $N_2$ upwards to the emission well to achieve separation of the $CO_2$.

Preferably, a method for making a horizontal injection channel is to implement hydraulic fracturing at the bottom end of the injection well to form an injection fracture surface, or to implement a directional horizontal well at the bottom end of the injection well, and to carry out staged pinnate fracturing inside the directional horizontal well, so as to form a horizontal injection channel.

Preferably, an open pressure of a backpressure valve of the emission well is set to be 0.3-0.4 MPa, and when a pressure of $N_2$ in the emission well reaches the open pressure, the backpressure valve of the emission well is opened to emit $N_2$ into atmosphere.

Preferably, during injecting the flue gas, characteristic changes of gas component, concentration and pressure in the storage rock stratum are monitored in real time by a backpressure valve of the monitoring well; and according to the changes of the gas component and concentration, water is injected into the storage rock stratum through the monitoring well to promote the capture and storage of $CO_2$ and sulfur nitride and the separation of $N_2$ in the flue gas.

Compared with the prior art, the present disclosure has the beneficial effects as follows:

According to the present disclosure, a well pattern mode, in which the injection well, a monitoring well and an emission well are arranged at different distances from a flue gas emission source, is adopted to promote the flue gas to migrate in an underground rock porous medium for a long distance to gradually undergo physical and chemical reaction process of differential adsorption, dissolution mineralization and biomass reaction. Moreover, in combination with a way of injecting a certain amount of water or saline or biomass water with a certain concentration into a storage rock stratum in real time by the monitoring well, effective capture and storage of $CO_2$ and sulfur nitride and separation and emission of $N_2$ in the flue gas are completed. The well pattern mode is a continuous integrated well pattern scheme for large-scale carbon storage of the flue gas.

(1) According to the present disclosure, there is no special need to capture or transport $CO_2$ on the ground, and thus it is not necessary to implement the ground capture and transportation process of $CO_2$ and the investment of related technical equipment, which greatly saves the operation cost. Moreover, the device and method provided by the present disclosure have the universal characteristics.

(2) The distance between the injection well and the emission well is more than 5 km, or even up to 10 km, which can achieve the gradual capture and separation during long-distance underground migration of the flue gas, so as to exchange space for time.

(3) Different from a single-well synchronous injection separation technology (the separation pressure needs to reach more than 40 MPa), the well pattern method provided by the present disclosure requires lower flue gas injection pressure, and it only needs to drive the gas to migrate in the porous rock stratum. Therefore, the daily injection pressure can be maintained within 10 MPa, which effectively reduces the daily energy consumption and the investment of compression equipment.

(4) The power plant does not need to be provided with desulfurization and denitrification equipment, or the desulfurization and denitrification equipment in the power plant is simplified, the flue gas is compressed and injected using the spontaneous electric energy of the power plant (the cost is generally 0.2-0.3 Yuan/kWh). The simplified environmental protection process and the extremely low electricity price can greatly reduce the daily operation cost. Electricity consumption is the main cost input of all carbon sequestration schemes, but in most CCUS projects, feed-in industrial electricity (the price is generally 0.7-1.1 Yuan/kWh) is adopted for compression canning and underground injection of gas, which is about 4 times of the electricity price provided in this method. According to the trading income of carbon market (80 Yuan/ton of $CO_2$), this method has certain profitability.

(5) The characteristics of the storage layer are artificially changed by injecting a certain amount of water or saline or biomass water with a certain concentration through the monitoring well, so as to promote the effects of capture, storage and separation.

(6) The storage rock stratum is not limited by regions and has wide applicability. The strata can all be used as geological storage areas of $CO_2$ as long as the strata have the thickness, porosity, water content and permeability meeting the requirements of storage, and good upper and lower caprocks. In particular, sandstones, limestones and basalts, which are widely distributed and have well-developed pores and fractures, can be used as the storage rock strata.

Figure 1:
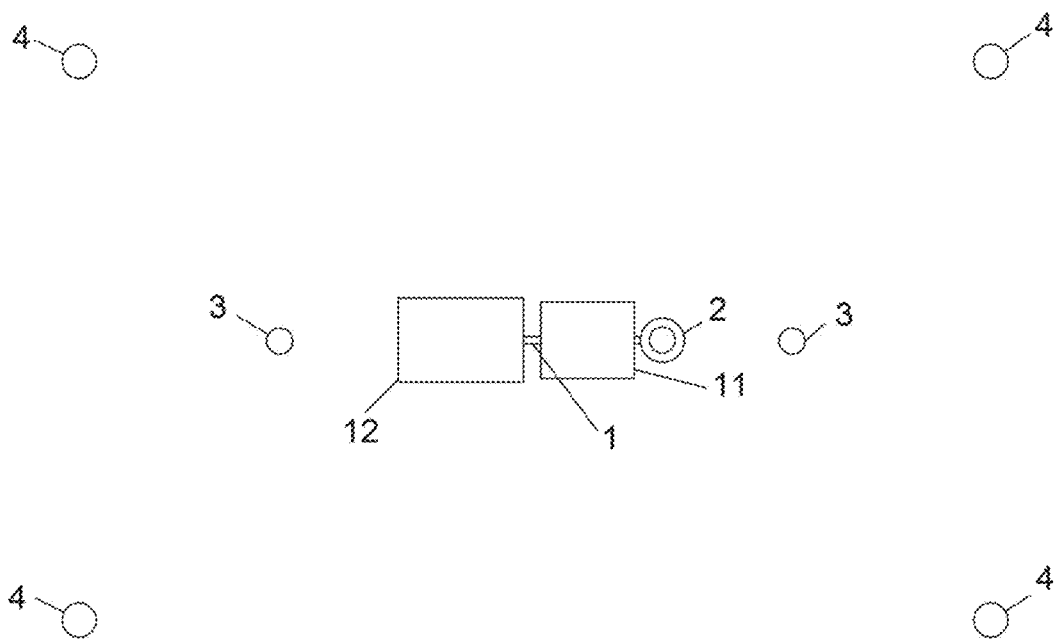
FIG. 1 is a plan view of an integrated well pattern technique for continuously capturing-storing-separating a small-scale flue gas in an underground rock stratum.

In the drawings: 1-flue gas outlet; 2-injection well; 3-monitoring well; 4-emission well; 5-storage rock stratum; 6-backpressure valve; 7-upper caprock; 8-lower caprock; 9-flue gas injection hole; 10-horizontal injection fracture surface; 11-gas compressor; 12-600,000 KW generator set; 13-1 million KW generator set; 14-directional horizontal well.

DETAILED DESCRIPTION

In order to make the technical problems to be solved by the present disclosure, technical solutions and beneficial effects more clearly, the present disclosure is further described in detail with reference with the embodiments and accompanying drawings. It should be understood that the specific embodiments described here are only used to explain the present disclosure, rather than limiting. The technical solution of the present disclosure is described in detail below in conjunction with the embodiments and accompanying drawings, but the scope of protection is not limited.

Embodiment 1

Figure 2:
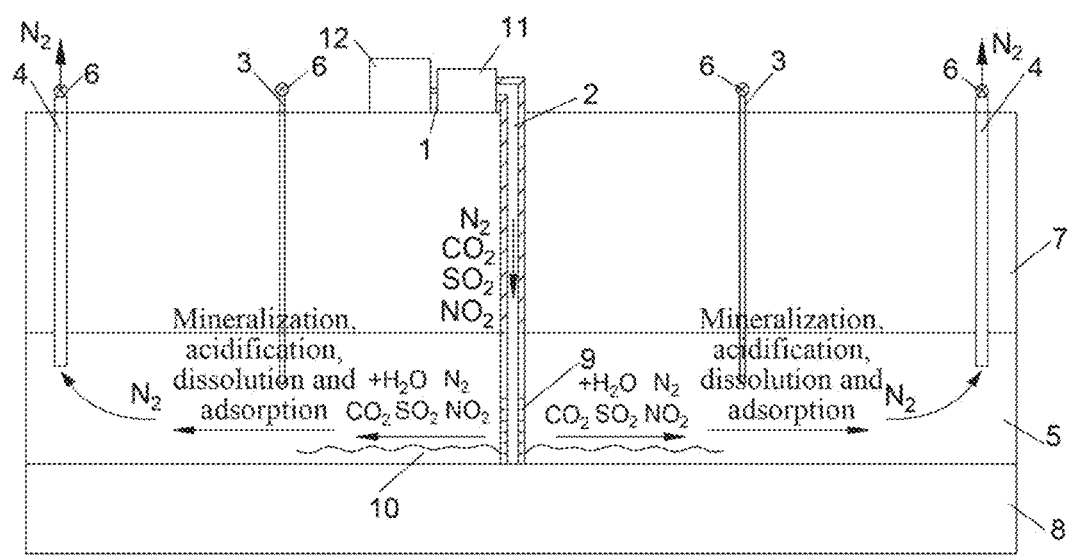
FIG. 2 is a front view of an integrated well pattern technique for continuously capturing-storing-separating a small-scale flue gas in an underground rock stratum.

The amount of coal consumed by a power plant with a 600,000 KW generator set is about 4,000 tons per day, and a concentration of $CO_2$ in a flue gas is 15%, so the power plant with 600,000 KW generator set emits $4 \times 10^7$ $m^3$ of flue gas per day, which belongs to small-scale flue gas emission level. Referring to FIG. 1 and FIG. 2, an integrated device and method for continuously capturing, storing and separating a flue gas in an underground rock stratum provided in this embodiment are used to separate and store the flue gas, specifically as follows:

(1) An injection well 2 is arranged at a linear distance of 0.2 km from a flue gas outlet 1 of a 600,000 KW generator set 12. Two monitoring wells 3 are arranged at a linear distance of 3 km from the flue gas outlet 1, and four emission wells 4 are arranged at a linear distance of 6 km from the flue gas outlet 1, as shown in FIG. 1. Pore aperture diameters of openings of the injection well 2, the monitoring well 3 and the emission well 4 on the ground are 350 mm, 80 mm and 120 mm, respectively.

(2) Drilling operation is as follows: referring to FIG. 2, the injection well 2, the monitoring well 3 and the emission well 4 are drilled to a lower middle region, a middle region and an upper middle region of a storage rock stratum 5, respectively, and the completion work of well is completed. Finally, backpressure valves 6 are installed at wellhead locations of the monitoring well 3 and the emission well 4, respectively. A roof of the storage rock stratum 5 is an impermeable upper caprock 7, and a floor of the storage rock stratum 5 is an impermeable lower caprock 8.

(3) A perforation operation is implemented in a storage rock stratum section at a lower portion in the injection well 2 to form a flue gas injection hole 9. Further, hydraulic fracturing is controlled and implemented at a bottom end of the injection well 2 to form a horizontal injection fracture surface 10. An extension radius of the horizontal injection fracture surface 10 is controlled within a middle position between the injection well 2 and the emission well 4, and the horizontal injection fracture surface 10 does not communicate with the monitoring well 3 during the horizontal extension.

(4) The flue gas continuously produced by the flue gas outlet 1, is removed dust and cooled, and then is pressed into the injection well 2 by a gas compressor 11 on the ground after the pressure is increased to 5 MPa, and then the flue gas enters the storage rock stratum 5 through the flue gas injection hole 9 and the horizontal injection fracture surface 10.

(5) During long-distance migration of the flue gas in the storage rock stratum 5, $CO_2$ and sulfur nitride are gradually enriched and captured in a rock porous medium due to the characteristics that the adsorption of $CO_2$ and sulfur nitride by the rock porous medium is greater than that of $N_2$. Meanwhile, the $CO_2$ and sulfur nitride, after chemically reacting with water and minerals in a rock, are gradually mineralized and stored. At the same time, the remaining $N_2$ is gradually sorted upwards and migrated to the emission well 4 to achieve separation.

(6) An open pressure of the backpressure valve 6 arranged at the emission well 4 is 0.3 MPa, after the $N_2$ pressure in the emission well 4 reaches the open pressure, the $N_2$ is emitted to atmosphere through the backpressure valve 6 of the emission well 4.

(7) During injecting the flue gas, characteristic changes of gas component, concentration and pressure in the storage rock stratum 5 are monitored in real time by the backpressure valve of the monitoring well 3. According to real-time change data of the gas component and concentration, a certain amount of water or saline or biomass water with a certain concentration is injected into the storage rock stratum 5 through the monitoring well 3, so as to promote the capture and storage of $CO_2$ and sulfur nitride and the separation of $N_2$ in the flue gas.

Embodiment 2

Figure 3:
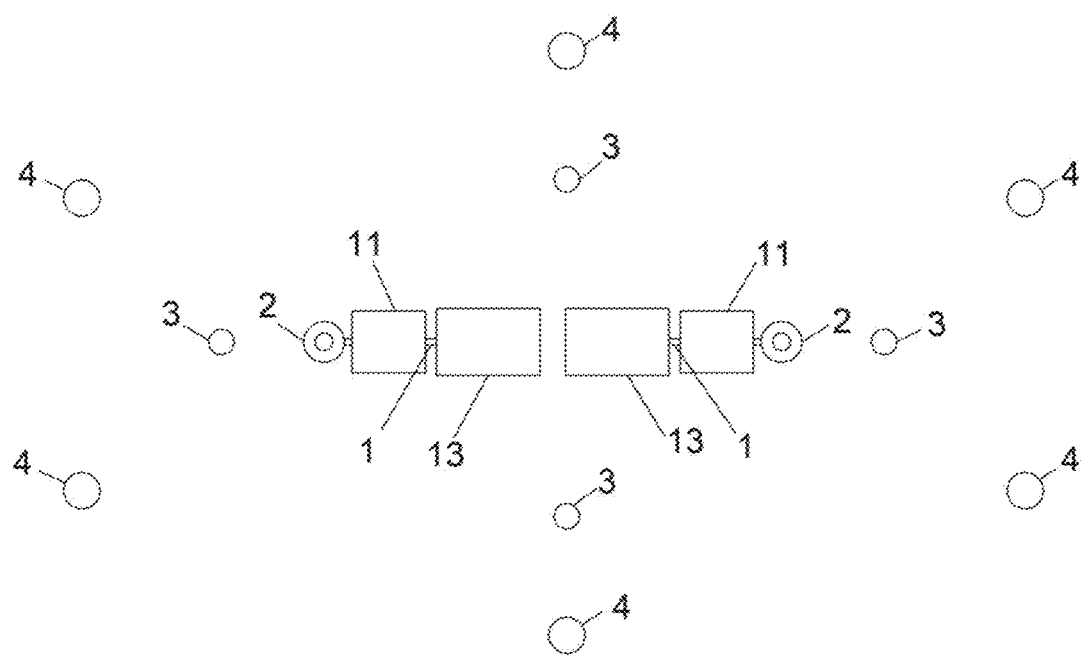
FIG. 3 is a plan view of an integrated well pattern technique for continuously capturing-storing-separating a large-scale flue gas in an underground rock stratum.
Figure 4:
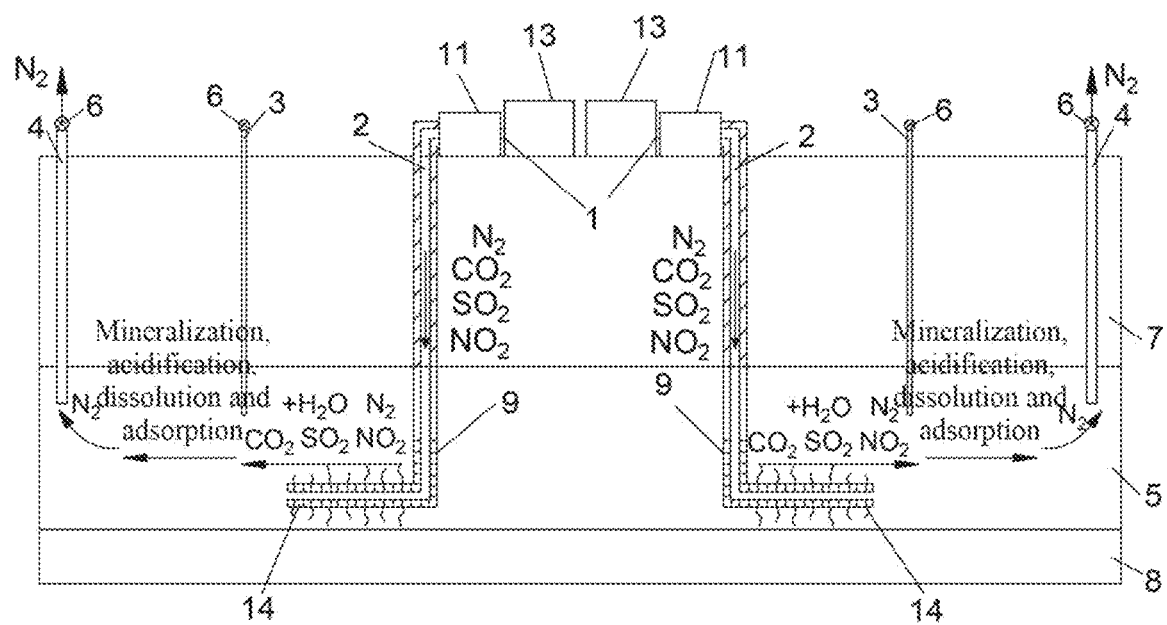
FIG. 4 is a front view of an integrated well pattern technique for continuously capturing-storing-separating a large-scale flue gas in an underground rock stratum.

The amount of coal consumed by a power plant with two 1 million KW generator sets is about 16,000 tons per day, and a concentration of $CO_2$ in a flue gas is 15%, so the power plant with the two 1 million KW generator sets emits $1.6 \times 10^8$ $m^3$ of flue gas per day, which belongs to medium and large-scale flue gas emission level. Referring to FIG. 3 and FIG. 4, a an integrated device and method for continuously capturing, storing and separating a flue gas in an underground rock stratum provided in this embodiment are used to separate and store the flue gas, specifically as follows:

(1) An injection well 2 is arranged at a linear distance of 0.3 km from a flue gas outlet 1 of each of the two 1 million KW generator sets 13. A monitoring well 3 is arranged at a linear distance of 4 km from each flue gas outlet 1, and meanwhile, one monitoring well 3 is arranged at a distance of 4 km from each of both sides of the two 1 million KW generator sets 13. Two emission wells 4 are arranged at a linear distance of 8 km from each of the two 1 million KW generator sets 13, and an emission well 4 is arranged at a distance of 8 km from each of both sides of the two 1 million KW generator sets 13. That is, two injection wells 2, four monitoring wells 3 and six emission wells 4 are arranged in total, as shown in FIG. 3. Pore aperture diameters of openings of the injection well 2, the monitoring well 3 and the emission well 4 on the ground are 450 mm, 90 mm and 150 mm, respectively.

(2) Drilling operation is as follows: referring to FIG. 2, the injection well 2, the monitoring well 3 and the emission well 4 are drilled to a lower middle region, a middle region and an upper middle region of a storage rock stratum 5, respectively, and the completion work of well is completed. Finally, backpressure valves 6 are installed at wellhead locations of the monitoring well 3 and the emission well 4, respectively. A roof of the storage rock stratum 5 is an impermeable upper caprock 7, and a floor of the storage rock stratum 5 is an impermeable lower caprock 8.

(3) A perforation operation is implemented in a storage rock stratum section at a lower portion in the injection well 2 to form a flue gas injection hole 9. Further, a directional horizontal well is implemented at a bottom end of the injection well 2, and the interior of the directional horizontal well is subjected to staged pinnate fracturing to form a horizontal well injection channel. A length of the directional horizontal well 14 is controlled within a middle position between the injection well 2 and the emission well 4, and the directional horizontal well 14 does not communicate with the monitoring well 3.

(4) The flue gas continuously produced by the flue gas outlet 1, is removed dust and cooled, and then is pressed into the two injection wells 2 by a gas compressor 11 on the ground after the pressure is increased to 8 MPa, and then the flue gas enters the storage rock stratum 5 through the flue gas injection hole 9 and the horizontal well injection channel.

(5) During long-distance migration of the flue gas in the storage rock stratum 5, $CO_2$ and sulfur nitride are gradually enriched and captured in a rock porous medium due to the characteristics that the adsorption of $CO_2$ and sulfur nitride by the rock porous medium is greater than that of $N_2$. Meanwhile, the $CO_2$ and sulfur nitride, after chemically reacting with water and minerals in a rock, are gradually mineralized and stored. At the same time, the remaining $N_2$ is gradually sorted upwards and migrated to the emission well 4 to achieve separation (Referring to FIG. 4).

(6) An open pressure of the backpressure valve 6 arranged at the emission well 4 is 0.4 MPa, after the $N_2$ pressure in the emission well 4 reaches the open pressure, the $N_2$ is emitted to atmosphere through the backpressure valve 6 of the emission well 4.

(7) During injecting the flue gas, characteristic changes of gas component, concentration and pressure in the storage rock stratum 5 are monitored in real time by the backpressure valve of the monitoring well 3. According to real-time change data of the gas component and concentration, a certain amount of water or saline or biomass water with a certain concentration is injected into the storage rock stratum 5 through the monitoring well 3 in real time, so as to promote the capture and storage of $CO_2$ and sulfur nitride and the separation of $N_2$ in the flue gas.

The above is a further detailed description of the present disclosure in conjunction with specific preferred embodiments, and cannot be considered that the specific embodiments of the present disclosure are limited thereto. For those of ordinary skill in the art, several simple deductions or substitutions can be made without departing from the present disclosure, which should all be regarded as belonging to the scope of protection determined by the claims submitted in the present disclosure.

What is claimed is:

1. An integrated device for continuously capturing, storing and separating a flue gas in an underground rock stratum, comprising:
an injection well, a monitoring well and an emission well, which are arranged in sequence at locations from near to far from a flue gas emission source, so as to form a well pattern,
the injection well comprising at least one injection well, the monitoring well comprising at least two monitoring wells, and the emission well comprising at least four emission wells, and a pore aperture diameter of each emission well being greater than that of each monitoring well and less than that of each injection well;
a well pattern mode promoting the flue gas to migrate in an underground rock porous medium for a distance to undergo a physical and chemical reaction process of differential adsorption, dissolution mineralization and biomass reaction, and in combination with a way of injecting an amount of water or saline or biomass water with a concentration into a storage rock stratum in real time by the monitoring wells, effective capture and storage of $CO_2$ and sulfur nitride and separation and emission of $N_2$ in the flue gas are completed;
a distance from the injection well to the flue gas emission source being less than 1 km, a distance from the monitoring wells to the flue gas emission source being 2-5 km, and a distance from the emission wells to the flue gas emission source being 5-10 km; the injection well, the monitoring wells and the emission wells being respectively drilled to different depths in a storage rock stratum; a horizontal injection channel being arranged at a bottom end of the injection well; a length of the horizontal injection channel being between the injection well and the emission wells, and the horizontal injection channel not being in communication with the monitoring wells;
a backpressure valve being arranged at a wellhead location of each of the monitoring wells and the emission wells; the flue gas being pressed into the injection well, an injection pressure of the flue gas being less than or equal to 10 MPa, and enters-entering the storage rock stratum along the horizontal injection channel; $CO_2$ and sulfur nitride in the flue gas being dynamically captured and stored during migrating of the flue gas in the storage rock stratum, and $N_2$ being separated and then migrated upwards to the emission well to be emitted; and
an end hole location of the injection well being located at a lower middle region of the storage rock stratum, an end hole location of each monitoring well being located at a middle region of the storage rock stratum, and an end hole location of each emission well being located at an upper middle region of the storage rock stratum.

2. The integrated device for continuously capturing, storing and separating a flue gas in an underground rock stratum according to claim 1, wherein the horizontal injection channel is formed by implementing hydraulic fracturing or a directional horizontal well at the bottom end of the injection well.

3. The integrated device for continuously capturing, storing and separating a flue gas in an underground rock stratum according to claim 1, wherein each of a roof and a floor of the storage rock stratum has a lithology of an impermeable caprock.

4. A method for capturing, storing and separating flue gas implemented by the integrated device for continuously capturing, storing and separating a flue gas in an underground rock stratum according to claim 1, the method comprising the following steps:
  (1) drilling and completing the injection well, the monitoring wells and the emission wells;
  (2) implementing a perforation operation at a storage rock stratum section at a lower portion in the injection well to form a flue gas injection hole, and making the horizontal injection channel at the bottom end of the injection well;
  (3) after dust removal and cooling, pressing the flue gas into the injection well, to enter the storage rock stratum through the flue gas injection hole and the horizontal injection channel, wherein an injection pressure of the flue gas is less than or equal to 10 MPa; and
  (4) during migrating the flue gas in the storage rock stratum, adsorbing $CO_2$ and sulfur nitride by a rock porous medium, and enriching the $CO_2$ and sulfur nitride into the rock porous medium to achieve capture of the $CO_2$; meanwhile, mineralizing the $CO_2$ and sulfur nitride after the $CO_2$ and sulfur nitride chemically react with water, minerals and biology bacteria in a rock to achieve storage of the $CO_2$, and migrating separated $N_2$ upwards to the emission well to achieve separation of the $CO_2$.

5. The method for capturing, storing and separating flue gas implemented by the integrated device for continuously capturing, storing and separating a flue gas in an underground rock stratum according to claim 4, wherein a method for making the horizontal injection channel is to implement hydraulic fracturing at the bottom end of the injection well to form an injection fracture surface, or to implement a directional horizontal well at the bottom end of the injection well, and to carry out staged pinnate fracturing inside the directional horizontal well, so as to form a horizontal injection channel.

6. The method for capturing, storing and separating flue gas implemented by the integrated device for continuously capturing, storing and separating a flue gas in an underground rock stratum according to claim 4, wherein an open pressure of each backpressure valve of each emission well is set to be 0.3-0.4 MPa, and wherein when a pressure of $N_2$ in each emission well reaches the open pressure, each backpressure valve of each emission well is opened to emit $N_2$ into atmosphere.

7. The method for capturing, storing and separating flue gas implemented by the integrated device for continuously capturing, storing and separating a flue gas in an underground rock stratum according to claim 4, wherein during pressing the flue gas, characteristic changes of gas component, concentration and pressure in the storage rock stratum are monitored in real time by at least one of the backpressure valves of the monitoring wells; and according to the changes of the gas component and concentration, water is injected into the storage rock stratum through at least one of the monitoring wells to promote the capture and storage of $CO_2$ and sulfur nitride and the separation of $N_2$ in the flue gas.

8. The method for capturing, storing and separating flue gas implemented by the integrated device for continuously capturing, storing and separating a flue gas in an underground rock stratum according to claim 4, wherein the horizontal injection channel is formed by implementing hydraulic fracturing or a directional horizontal well at the bottom end of the injection well.

9. The method for capturing, storing and separating flue gas implemented by the integrated device for continuously capturing, storing and separating a flue gas in an underground rock stratum according to claim 4, wherein each of a roof and a floor of the storage rock stratum has a lithology of an impermeable caprock.

\* \* \* \* \*